United States Patent
Ludwig et al.

(10) Patent No.: US 10,128,791 B2
(45) Date of Patent: Nov. 13, 2018

(54) STRUCTURES AND METHODS FOR SUPPORTING SOLAR PANELS

(71) Applicants: Thomas Robert Ludwig, Brooklyn, NY (US); Gaelen Clark McKee, Brooklyn, NY (US); Mark Hilary Cunningham, Brooklyn, NY (US)

(72) Inventors: Thomas Robert Ludwig, Brooklyn, NY (US); Gaelen Clark McKee, Brooklyn, NY (US); Mark Hilary Cunningham, Brooklyn, NY (US)

(73) Assignee: Brooklyn Solar Works, Brooklyn, NY (US)

( * ) Notice: Subject to any disclaimer, the term of this patent is extended or adjusted under 35 U.S.C. 154(b) by 0 days.

(21) Appl. No.: 15/674,425

(22) Filed: Aug. 10, 2017

(65) Prior Publication Data

US 2018/0048260 A1    Feb. 15, 2018

Related U.S. Application Data

(60) Provisional application No. 62/373,621, filed on Aug. 11, 2016.

(51) Int. Cl.
| | |
|---|---|
| *F24J 2/52* | (2006.01) |
| *H02S 20/23* | (2014.01) |
| *H02S 30/10* | (2014.01) |
| *F24S 25/37* | (2018.01) |
| *F24S 25/12* | (2018.01) |
| *F24S 25/61* | (2018.01) |
| *F24S 25/636* | (2018.01) |
| *F24S 25/65* | (2018.01) |

(Continued)

(52) U.S. Cl.
CPC ............. *H02S 20/23* (2014.12); *F24S 25/10* (2018.05); *F24S 25/12* (2018.05); *F24S 25/37* (2018.05); *F24S 25/61* (2018.05); *F24S 25/636* (2018.05); *F24S 25/65* (2018.05); *H02S 30/10* (2014.12); *F24S 2025/6006* (2018.05); *F24S 2025/6011* (2018.05)

(58) Field of Classification Search
CPC .......... F24J 2/5232; F24J 2/5233; F24J 2/523; H02S 20/10; H02S 20/30; F24S 25/13; F24S 25/12; F24S 25/61; F24S 25/65; F24S 25/37
USPC ................................ 211/41.1; 52/633, 173.3
See application file for complete search history.

(56) References Cited

U.S. PATENT DOCUMENTS

| | | | | |
|---|---|---|---|---|
| 4,386,600 A | * | 6/1983 | Eggert, Jr. ................. | F24J 2/14 126/573 |
| 6,571,527 B1 | * | 6/2003 | Rattini ...................... | E04C 3/08 52/692 |
| 8,887,470 B2 | * | 11/2014 | Werner ...................... | F24J 2/14 126/600 |

(Continued)

*Primary Examiner* — Kimberley S Wright
(74) *Attorney, Agent, or Firm* — Byrne Poh LLP (57) ABSTRACT

Structures and methods for supporting solar panels are provided. The structure includes a plurality of tee extrusions, a plurality of legs, a plurality of trusses, a plurality of ridge rails, and a plurality of clips. The tee extrusions form two parallel tracks upon which the legs are secured. The legs project upward from the extrusions and are coupled to the trusses, which are above and perpendicular to the trusses. At least four legs support each truss. The ridge rails sit on the truss and a parallel to the extrusions. The solar panels sit on the ridge rails and are secured to the ridge rails by the clips.

1 Claim, 8 Drawing Sheets

(51) Int. Cl.
*F24S 25/10* (2018.01)
*F24S 25/60* (2018.01)

(56) References Cited

U.S. PATENT DOCUMENTS

| | | | | |
|---|---|---|---|---|
| 8,991,388 B2* | 3/2015 | Brothersen | ............ | F24J 2/5233 126/600 |
| 9,157,664 B2* | 10/2015 | Place | ............ | F24J 2/523 |
| 9,163,861 B2* | 10/2015 | Al-Haddad | ............ | F24J 2/525 |
| 9,534,386 B2* | 1/2017 | Brothersen | ............ | F24J 2/5233 |
| 2010/0050560 A1* | 3/2010 | Werner | ............ | F24J 2/14 52/693 |
| 2010/0154780 A1* | 6/2010 | Linke | ............ | F24J 2/5239 126/573 |
| 2011/0192394 A1* | 8/2011 | Brothersen | ............ | F24J 2/5233 126/680 |
| 2012/0085041 A1* | 4/2012 | Place | ............ | F24J 2/523 52/173.3 |
| 2012/0131916 A1* | 5/2012 | Reynolds | ............ | F24J 2/14 60/641.15 |
| 2012/0174981 A1* | 7/2012 | Karg | ............ | F24J 2/5232 136/259 |
| 2012/0291374 A1* | 11/2012 | Zante | ............ | F24J 2/5232 52/173.3 |
| 2013/0048582 A1* | 2/2013 | Kruse | ............ | F24J 2/541 211/41.1 |
| 2014/0117190 A1* | 5/2014 | Werner | ............ | F24J 2/14 248/346.03 |
| 2014/0158649 A1* | 6/2014 | Al-Haddad | ............ | F24J 2/525 211/41.1 |
| 2015/0034575 A1* | 2/2015 | Warpup | ............ | H02S 20/10 211/41.1 |
| 2015/0176280 A1* | 6/2015 | Brothersen | ............ | F24J 2/5233 52/173.3 |
| 2016/0118929 A1* | 4/2016 | Krause | ............ | H02S 20/32 136/246 |
| 2017/0077864 A1* | 3/2017 | Goodman | ............ | H02S 20/10 |
| 2017/0179870 A1* | 6/2017 | Zante | ............ | H02S 20/23 |

* cited by examiner

STRUCTURES AND METHODS FOR SUPPORTING SOLAR PANELS

CROSS REFERENCE TO RELATED APPLICATION

This application claims the benefit of U.S. Provisional Patent Application No. 62/373,621 filed Aug. 11, 2016, which is hereby incorporated by reference herein in its entirety.

BACKGROUND

Solar energy has seen rapid advances in technology and usage in recent years.

In some implementations, solar (photo-voltaic (PV)) panels are mounted on southern facing roofs. For example, in a typical gable roof in which two portions of the roof angle downward from a roof peak, a solar panel may be placed on the portion of the roof that is most southern facing. This panel may be secured to the roof by directly or indirectly bolting the panel to the roofing structure. When secured, there is very little (if any) spacing between the solar panel and the roof.

In certain types of roofs, however, it is not possible to mount a panel to the roof with little or no space between the panel and the roof. For example, a roof may contain mechanical equipment, pipers, ventilation, chimneys, etc. that are already mounted on the roof. As another example, space on the roof may be configured for recreations, such as by having a deck mounted thereon.

Accordingly, new structures and methods for supporting solar panels are desirable.

SUMMARY

In accordance with some embodiments, structures and methods for supporting solar panels are provided. In some embodiments, structures for supporting solar panels are provided, the structures comprising: a first tee extrusion and a second tee extrusion that are positioned in parallel to each other and a first distance apart a plurality of trusses, each having a length that is less than the first distance, each being positioned above the first extrusion and the second extrusion, each having a first end and a second end, and each having an axis between the first end and the second end that is substantially perpendicular to an axis of the first tee extrusion and an axis of the second tee extrusion; a first pair of legs, each having a first end and a second end, each having a first end coupled to the first end of a first of the plurality of trusses, and each having a second end coupled to the first tee extrusion, wherein the second ends of the first pair of legs are further apart than the first ends of the first pair of legs; a second pair of legs, each having a first end and a second end, each having a first end coupled to the second end of a first of the plurality of trusses, and each having a second end coupled to the second tee extrusion, wherein the second ends of the second pair of legs are further apart than the first ends of the second pair of legs; a third pair of legs, each having a first end and a second end, each having a first end coupled to the first end of a second of the plurality of trusses, and each having a second end coupled to the first tee extrusion, wherein the second ends of the third pair of legs are further apart than the first ends of the third pair of legs; a fourth pair of legs, each having a first end and a second end, each having a first end coupled to the second end of a second of the plurality of trusses, and each having a second end coupled to the second tee extrusion, wherein the second ends of the fourth pair of legs are further apart than the first ends of the fourth pair of legs; a plurality of ridge rails that sit on top of the plurality of trusses and that are parallel to the first tee extrusion and the second tee extrusion; and a plurality of clips that are secured to the plurality of ridge rails and that secure the solar panels to the ridge rails.

DETAILED DESCRIPTION

Structures and methods for supporting solar panels are provided. In accordance with some embodiments, these structures and methods can be used to support solar panels on a roof of a building. By elevating the panels above the top of the building, the roof can be accessed for the purposes of maintenance, recreation, or any other suitable purpose.

Figure 1:
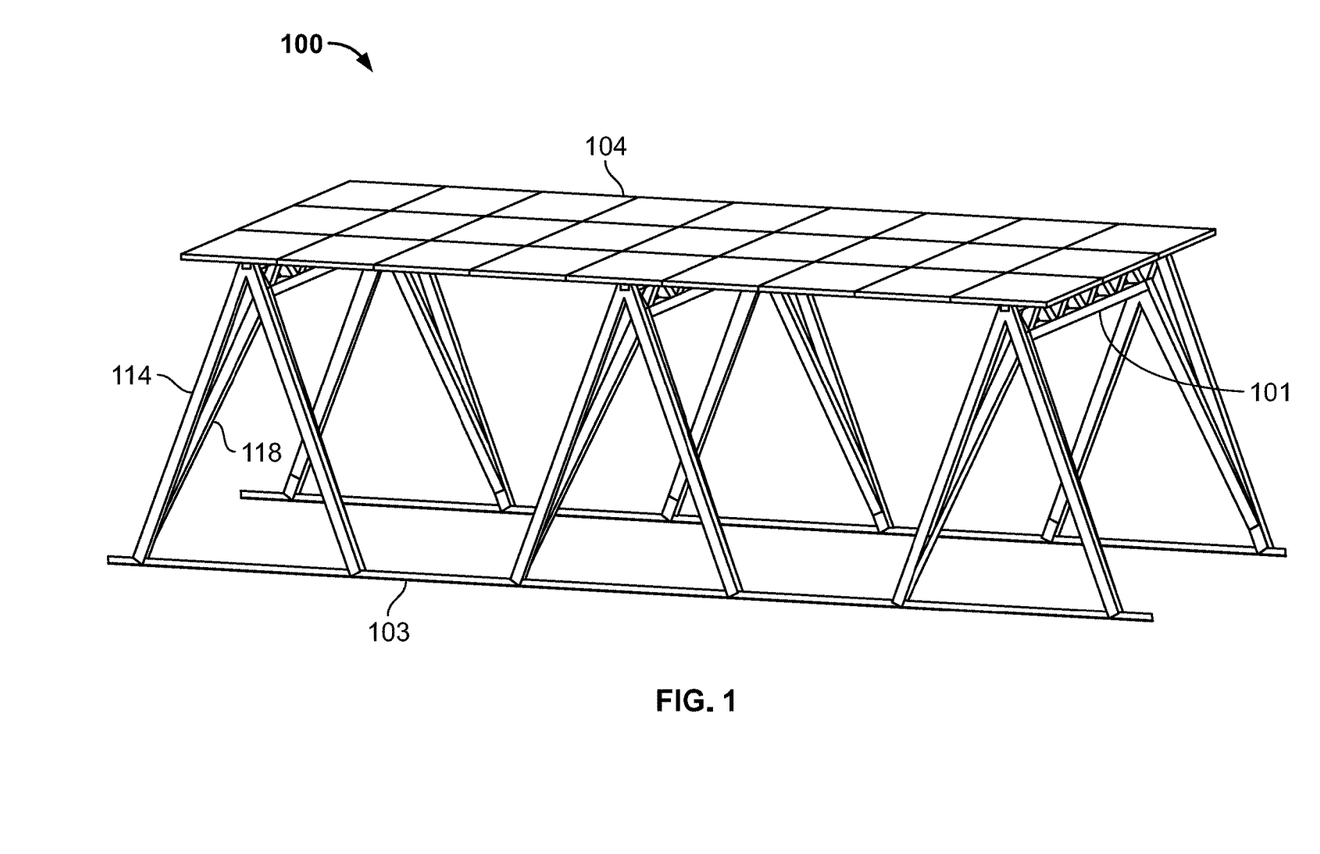
FIG. 1 is an example of a structure for supporting solar panels in accordance with some embodiments.

Turning to FIG. 1, an example 100 of a structure for supporting solar panels is illustrated. As shown, a set of solar panels 104 can be supported on structure 100. This structure can include a truss 101, verticals 114 and 118, and a tee extrusion 103.

Figure 2:
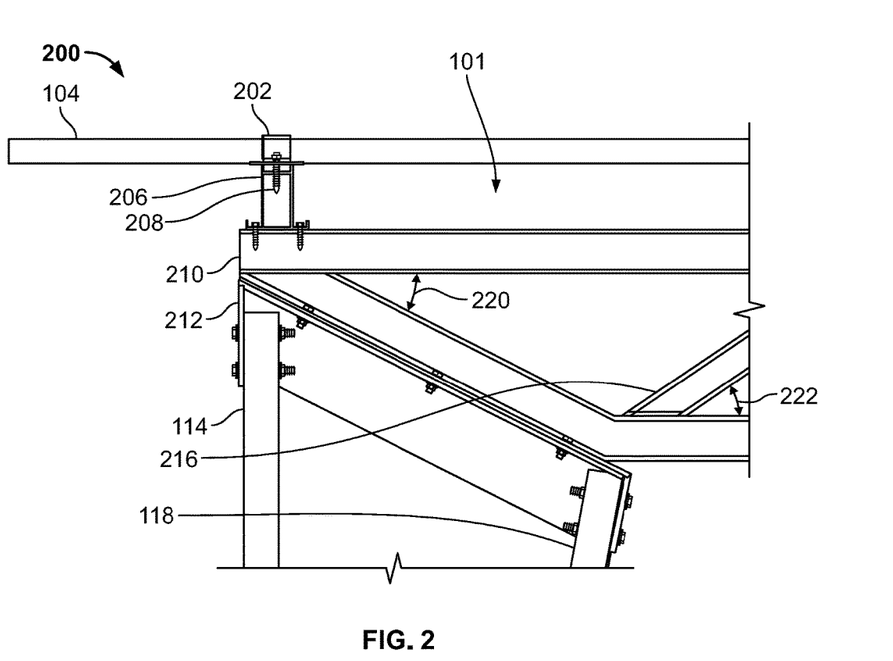
FIG. 2 is an example of a top portion of a structure for supporting solar panels in accordance with some embodiments.

A more detailed example of a portion of structure 100 is shown in FIG. 2. As illustrated, a solar (PV) panel 104 can sit on top of a ridge rail 206, and be secured to the ridge rail using end clamps 202, mid clamps (not shown), and screws 208. Any suitable solar panel can be used as panel 104. Any suitable clamps can be used as end claims 202 and the mid clamps. Any suitable screws can be used as screws 208, such as #14 gasketed self-drilling screws.

Ridge rail 206 can sit on top of truss 101. Truss 101 can be formed from outer truss members 210 and diagonals 216. Any suitable materials can be used to form members 210 and diagonals 216. For example, in some embodiments, members 210 can be formed from 2.5"×2.5"×0.25" aluminum square tubing. As another example, in some embodiments, diagonals 216 can be formed from 2"×2"×0.1875" aluminum square tubing. The members and the diagonals can be welded into a truss structure. In some embodiments, the truss can have angles 220 (27 degrees) and 222 (34 degrees) as shown, or any other suitable angles.

As shown in FIG. 2, a plate hanger 212 can be bolted to the truss. Hanger 212 can connect the truss to verticals 114 and 118 using bolts as shown. The plate hanger can be formed from any suitable material, such as 0.25" aluminum, in some embodiments. Verticals 114 and 118 can be formed from any suitable material, such as 2"×2"×0.25" aluminum square tubing. Any suitable bolts, such as stainless steel bolts, can be used to connect plate hanger 212 to truss 101 and verticals 114 and 118.

Figure 3:
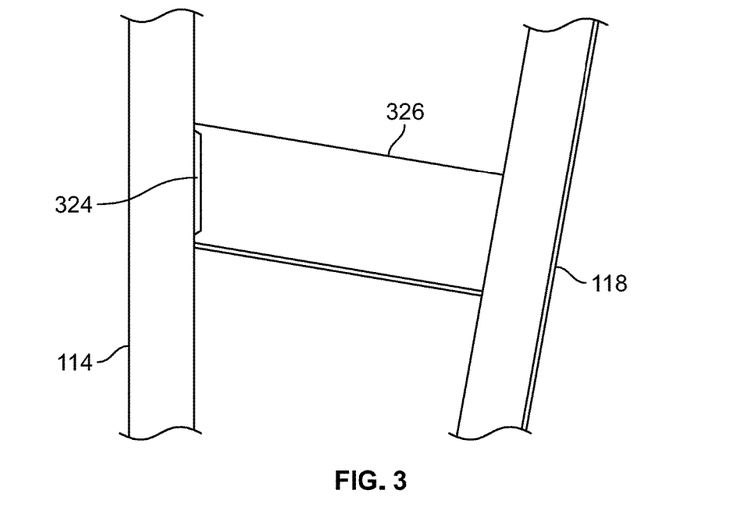
FIG. 3 is an example of a support bracket for structure for supporting solar panels in accordance with some embodiments.

As shown in FIG. 3, at any suitable one or more points (e.g., such as the middle) along the length of verticals 114 and 118, support brackets 326 can be formed. As illustrated, in some embodiments, these brackets can be welded by a weld 324 to vertical 114 and welded by a weld (not shown) to vertical 118. The brackets can be made of any suitable material, such as 0.25"×4" aluminum plate.

Figure 4:
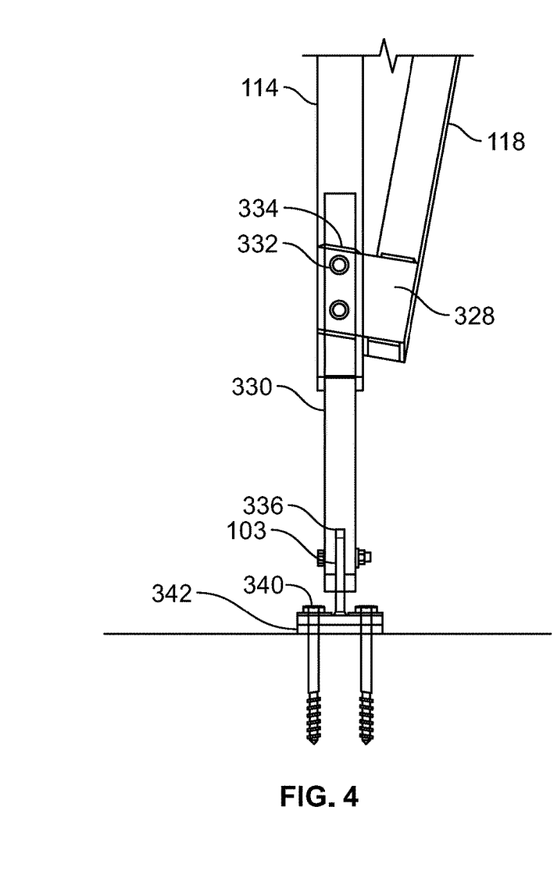
FIG. 4 is an example of a bottom portion of a structure for supporting solar panels in accordance with some embodiments.

Similarly, as shown in FIG. 4, brackets 328 can be used to secure the bottom of verticals 114 and 118 to each other as shown in FIG. 4. Bracket 328 can be formed from any suitable materials, such as 0.25"×4" aluminum plate. Bracket can be attached to verticals using any suitable approach, such as a weld 334.

A sleeve 330 can be attached to the bottom of vertical 114 as illustrated in FIG. 4. As shown, the sleeve can slide inside of vertical 114 and be bolted to vertical 114 by bolts 332. A notch 336 can be milled into the bottom of sleeve 330 so that the sleeve can engage tee extrusion 103. Sleeve 330 can be formed from any suitable materials, such as 1.5" square solid aluminum. Tee extrusion 103 can be formed from any suitable material, such as a 4"×4"×0.375" aluminum tee extrusion.

Tee extrusion 103 can be placed on top of shims 342 and bolted to roof rafters (not shown) using lag bolts 342. Shims 342 can be made of any suitable material, such as high-density polyethylene (HDPE). Bolts 340 can be made of any suitable material, such as stainless steel.

Figure 5:
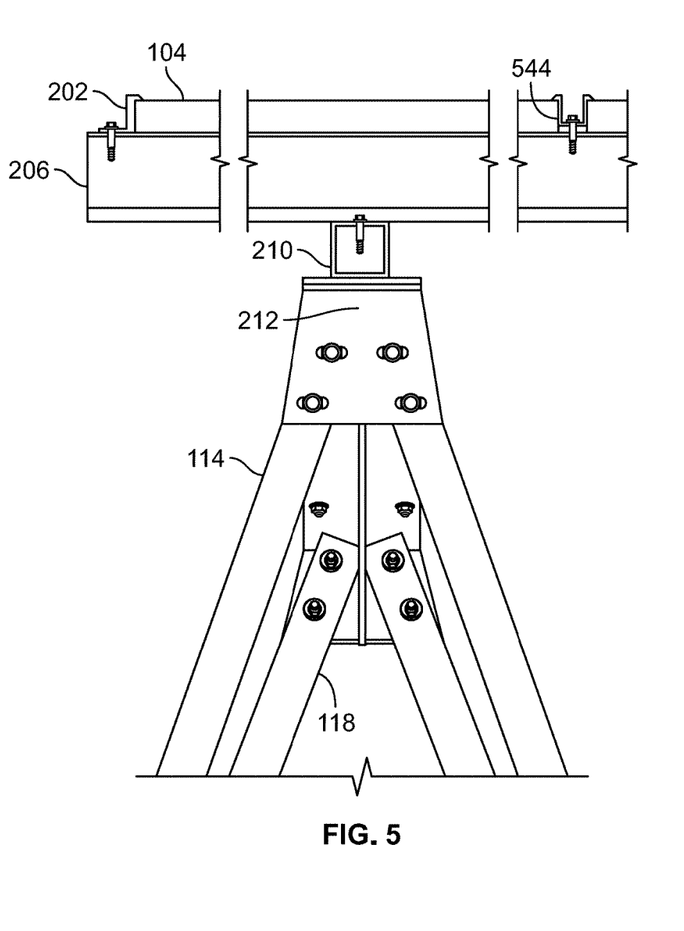
FIG. 5 is an example of an alternate view of a top portion of a structure for supporting solar panels in accordance with some embodiments.

Turning to FIG. 5, an alternate view of structure 100 is shown. As illustrated, solar panel 104 is sitting on ridge rail 206 and is held in place by end claims 202 and mid clamps 544. Ridge rail 206 sits on truss member 210, which is bolted via truss 101 to plate hanger 212. Plate hanger 212 is bolted to verticals 114 and 118.

Figure 6:
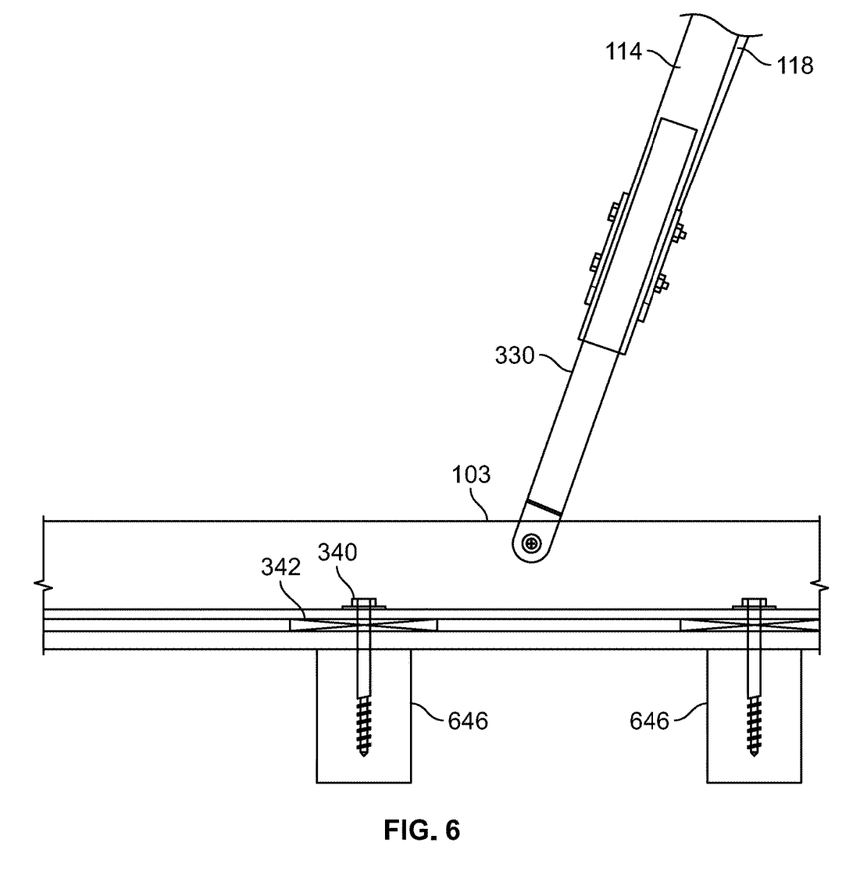
FIG. 6 is an example of an alternate view of a bottom portion of a structure for supporting solar panels in accordance with some embodiments.

FIG. 6 shows an alternate view of the bottom of structure 100. As shown, verticals 114 and 118 are connected to tee extrusion 103 by sleeve 330, the tee extrusion sits on shims 342, and the tee extrusion is bolted to roofing rafters 646 by bolts 340.

Figure 7:
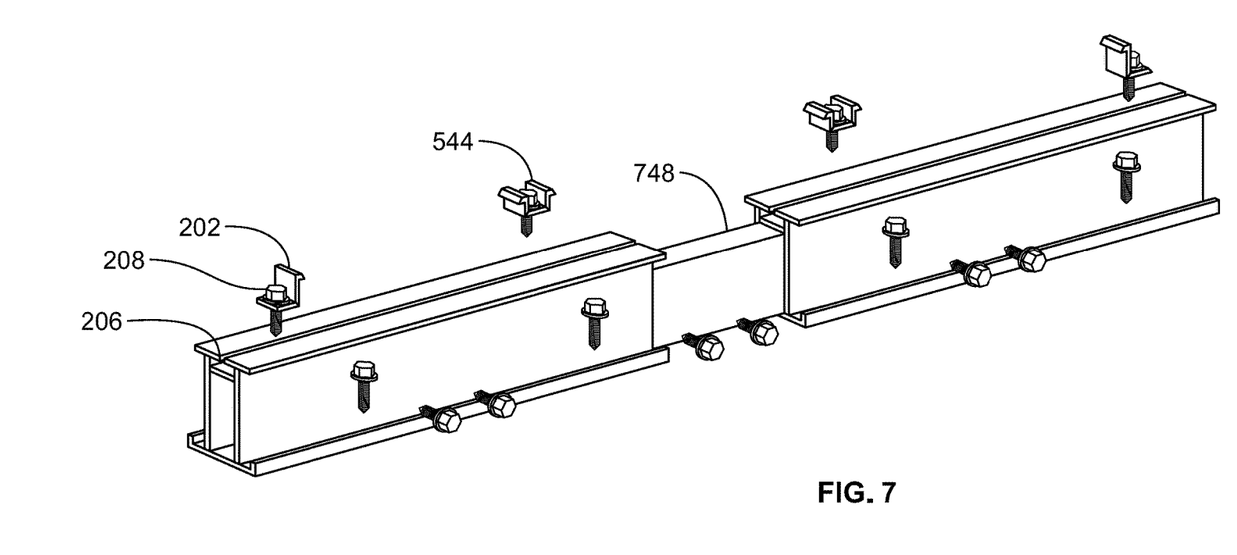
FIG. 7 is an example of a connector tube connecting two ridge rails that can be used in a structure for supporting solar panels in accordance with some embodiments.

As shown in FIG. 7, a connector tube 748 can be used to connect two ridge rails 206. The connector tube and ridge rails can be secured by bolts in some embodiments. As also shown, end clamps 202 and mid clamps 544 can be secured to the ridge rails using screws 208.

Figure 8:
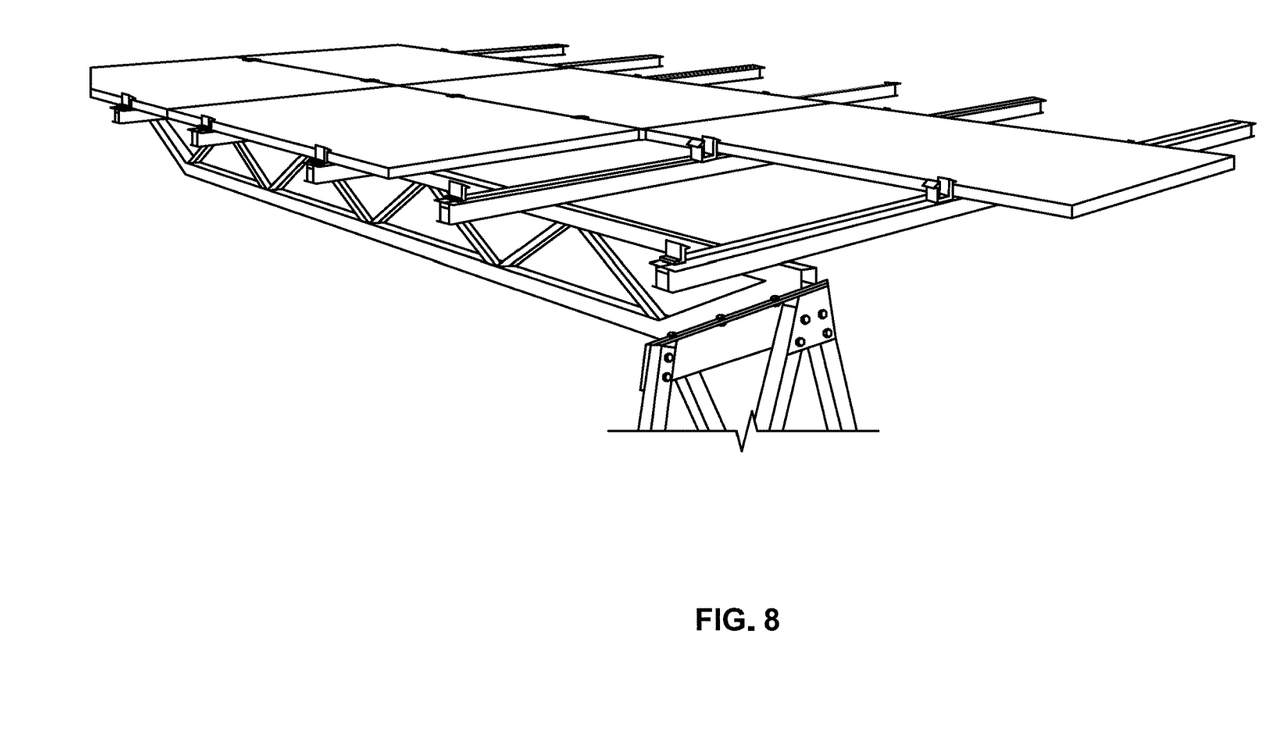
FIG. 8 is an example of an alternate partial view of a structure for supporting solar panels in accordance with some embodiments.

FIG. 8 is yet another partial view of structure 100.

Figure 9:
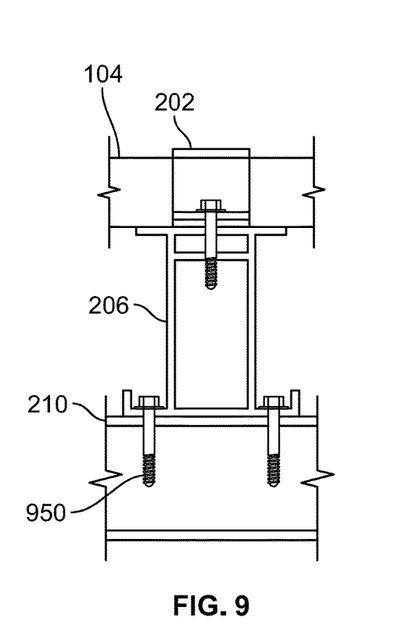
FIG. 9 is an example of yet another view of a top portion of a structure for supporting solar panels in accordance with some embodiments.
Figure 10:
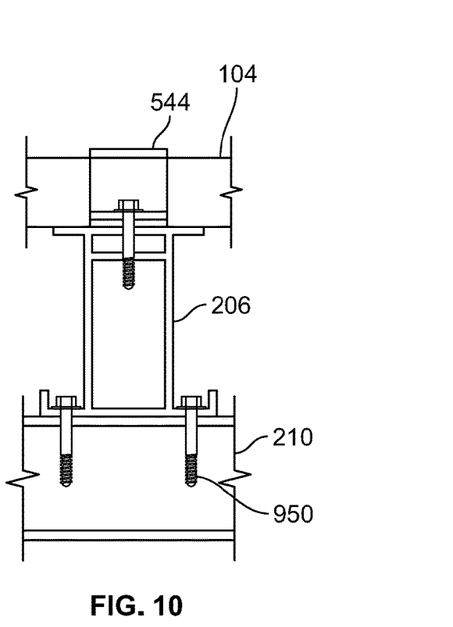
FIG. 10 is an example of still another view of a top portion of a structure for supporting solar panels in accordance with some embodiments.

FIGS. 9 and 10 show alternate views of the portion of structure 100 including solar panels 104, ridge rails 206, and outer truss members 210. As illustrated in FIG. 9, end clamps 202 can secure the solar panels to the ridge rail and the ridge rail can be secured to the outer truss members using screws 950. Likewise, as illustrated in FIG. 10, mid clamps 544 can secure the solar panels to the ridge rail and the ridge rail can be secured to the outer truss members using screws 950. Any suitable screws 950, such as stainless steel, corrosion resistant, self-drilling screws, can be used.

Figure 11:
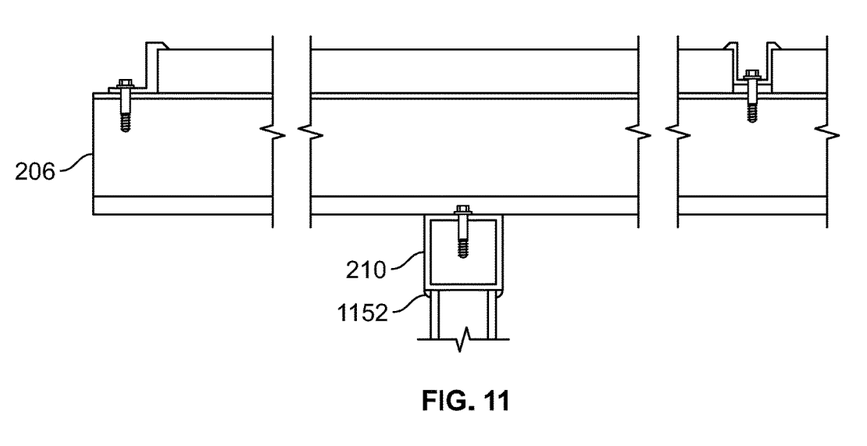
FIG. 11 is an example of a still further view of a top portion of a structure for supporting solar panels in accordance with some embodiments.

Still another view of the portion of structure 100 including solar panels 104, ridge rails 206, and outer truss members 210 is shown in FIG. 11. As illustrated, outer truss member 210 can be secured to the remainder of the truss via a welded gusset 1152.

Figure 12:
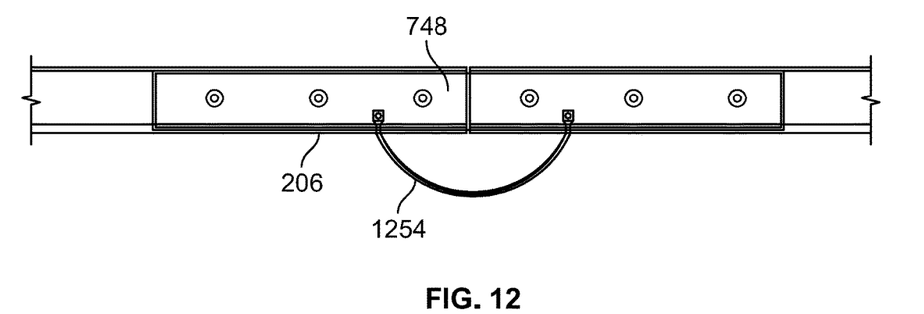
FIG. 12 illustrates and example of two ridge rails connected via a connector tube and electrically connected by a grounding strap.

FIG. 12 illustrates and example of two ridge rails 206 connected via a connector tube 748 and electrically connected by a grounding strap 1254. Any suitable ground strap can be used in some embodiments.

Although the disclosed subject matter has been described and illustrated in the foregoing illustrative implementations, it is understood that the present disclosure has been made only by way of example, and that numerous changes in the details of implementation of the disclosed subject matter can be made without departing from the spirit and scope of the disclosed subject matter. Features of the disclosed implementations can be combined and rearranged in various ways.

What is claimed is:

1. A structure for supporting solar panels, comprising:
 a first tee extrusion and a second tee extrusion that are positioned in parallel to each other and a first distance apart;
 a plurality of trusses, each having a length that is less than the first distance, each being positioned above the first extrusion and the second extrusion, each having a first end and a second end, and each having an axis between the first end and the second end that is substantially perpendicular to an axis of the first tee extrusion and an axis of the second tee extrusion;
 a first pair of legs, each having a first end and a second end, each having a first end coupled to the first end of a first of the plurality of trusses, and each having a second end coupled to the first tee extrusion, wherein the second ends of the first pair of legs are further apart than the first ends of the first pair of legs, and wherein each of the second ends of the first pair of legs includes a notch for engaging the first tee extrusion;
 a second pair of legs, each having a first end and a second end, each having a first end coupled to the second end of a first of the plurality of trusses, and each having a second end coupled to the second tee extrusion, wherein the second ends of the second pair of legs are further apart than the first ends of the second pair of legs, and wherein each of the second ends of the second pair of legs includes a notch for engaging the second tee extrusion;
 a third pair of legs, each having a first end and a second end, each having a first end coupled to the first end of a second of the plurality of trusses, and each having a second end coupled to the first tee extrusion, wherein the second ends of the third pair of legs are further apart than the first ends of the third pair of legs, and wherein each of the second ends of the third pair of legs includes a notch for engaging the first tee extrusion;
 a fourth pair of legs, each having a first end and a second end, each having a first end coupled to the second end of a second of the plurality of trusses, and each having a second end coupled to the second tee extrusion, wherein the second ends of the fourth pair of legs are further apart than the first ends of the fourth pair of legs, and wherein each of the second ends of the fourth pair of legs includes a notch for engaging the second tee extrusion;
a plurality of ridge rails that sit on top of the plurality of trusses and that are parallel to the first tee extrusion and the second tee extrusion; and
a plurality of clips that are secured to the plurality of ridge rails and that secure the solar panels to the ridge rails.

* * * * *